United States Patent
Cortes et al.

(10) Patent No.: US 10,745,537 B2
(45) Date of Patent: Aug. 18, 2020

(54) POLYMER FOAMS

(71) Applicant: FINA TECHNOLOGY, INC., Houston, TX (US)

(72) Inventors: Leonardo Cortes, League City, TX (US); Fengkui Li, Houston, TX (US); Jon Tippet, League City, TX (US); Kenneth Paul Blackmon, Houston, TX (US); Marc Mayhall, Houston, TX (US); Leland Daniels, Dayton, TX (US); John Ashbaugh, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/622,964

(22) Filed: Feb. 16, 2015

(65) Prior Publication Data

US 2016/0237239 A1 Aug. 18, 2016

(51) Int. Cl.

| | |
|---|---|
| *C08J 9/00* | (2006.01) |
| *C08K 3/22* | (2006.01) |
| *C08K 3/26* | (2006.01) |
| *C08F 257/02* | (2006.01) |
| *C08J 9/14* | (2006.01) |
| *C08J 9/12* | (2006.01) |
| *C08K 5/098* | (2006.01) |
| *C08K 3/013* | (2018.01) |
| *C08F 220/06* | (2006.01) |

(52) U.S. Cl.
CPC .............. *C08K 3/26* (2013.01); *C08F 257/02* (2013.01); *C08J 9/00* (2013.01); *C08J 9/0023* (2013.01); *C08J 9/122* (2013.01); *C08J 9/125* (2013.01); *C08J 9/141* (2013.01); *C08K 3/013* (2018.01); *C08K 5/098* (2013.01); *C08F 220/06* (2013.01); *C08J 2203/06* (2013.01); *C08J 2203/10* (2013.01); *C08J 2203/14* (2013.01); *C08J 2323/02* (2013.01); *C08J 2325/04* (2013.01); *C08K 3/22* (2013.01); *C08K 2003/2296* (2013.01); *C08K 2003/262* (2013.01)

(58) Field of Classification Search
CPC .... C08F 220/06; C08F 220/56; C08F 257/02; A61L 15/60; C08J 9/00; C08J 9/0023; C08J 9/122; C08J 9/125; C08J 9/141; C08J 2203/06; C08J 2203/10; C08J 2203/14; C08J 2323/02; C08J 2325/04; C08K 3/013; C08K 3/26; C08K 5/098; C08K 2003/2296; C08K 2003/262; C08K 3/22

See application file for complete search history.

(56) References Cited

U.S. PATENT DOCUMENTS

| | | | | |
|---|---|---|---|---|
| 4,252,906 | A * | 2/1981 | Hosokawa | C08J 9/0014 521/143 |
| 4,476,297 | A * | 10/1984 | Kablitz | C08F 6/02 528/486 |
| 5,208,362 | A * | 5/1993 | Glass | C07F 9/025 558/146 |
| 5,209,485 | A * | 5/1993 | Nesbitt | A63B 37/0003 473/280 |
| 6,583,190 | B2 * | 6/2003 | Lee | C08J 9/127 521/142 |
| 6,720,364 | B2 * | 4/2004 | Sueda | C08K 5/098 521/134 |
| 7,179,873 | B2 | 2/2007 | Reimers et al. | |
| 2002/0077379 | A1 | 6/2002 | Hughes et al. | |
| 2012/0220730 | A1 | 8/2012 | Li et al. | |
| 2013/0053496 | A1 * | 2/2013 | Austin | C08K 5/0091 524/396 |
| 2013/0137824 | A1 | 5/2013 | Gray et al. | |

FOREIGN PATENT DOCUMENTS

| | | | |
|---|---|---|---|
| JP | 2006089637 | * | 6/2006 |
| WO | WO2012174568 A2 | | 12/2012 |

OTHER PUBLICATIONS

International Search Report and Written Opinion issued in PCT/US15/16000, dated May 15, 2015, 8 pages.

* cited by examiner

*Primary Examiner* — Irina S Zemel
(74) *Attorney, Agent, or Firm* — Albert Shung

(57) ABSTRACT

A polymeric composition may include a polyolefin or styrenic polymer, a metallic acrylate salt, and an acid neutralizer.

12 Claims, 4 Drawing Sheets

POLYMER FOAMS

FIELD

Embodiments of the present disclosure generally relate to foams made from polymers.

BACKGROUND

Polymers may be used for various foamed applications, particularly for applications requiring lightweight energy management or cushioning. Examples include automotive components, packaging, dunnage, thermal insulation, and safety applications where repeated impact may occur.

SUMMARY

An embodiment of the present disclosure includes a polymeric composition. The polymeric composition includes a polyolefin or styrenic polymer, a metallic acrylate salt, and an acid neutralizer.

Another embodiment of the present disclosure includes a process that includes supplying a polymeric composition which includes a metallic acrylate salt, an acid neutralizer, and a polyolefin or styrenic polymer resin, and mixing the polymeric composition and a foaming agent to form a polymer foam.

BRIEF DESCRIPTION OF THE DRAWING

The present disclosure is best understood from the following detailed description when read with the accompanying figure.

DETAILED DESCRIPTION

Introduction and Definitions

Figure 1:
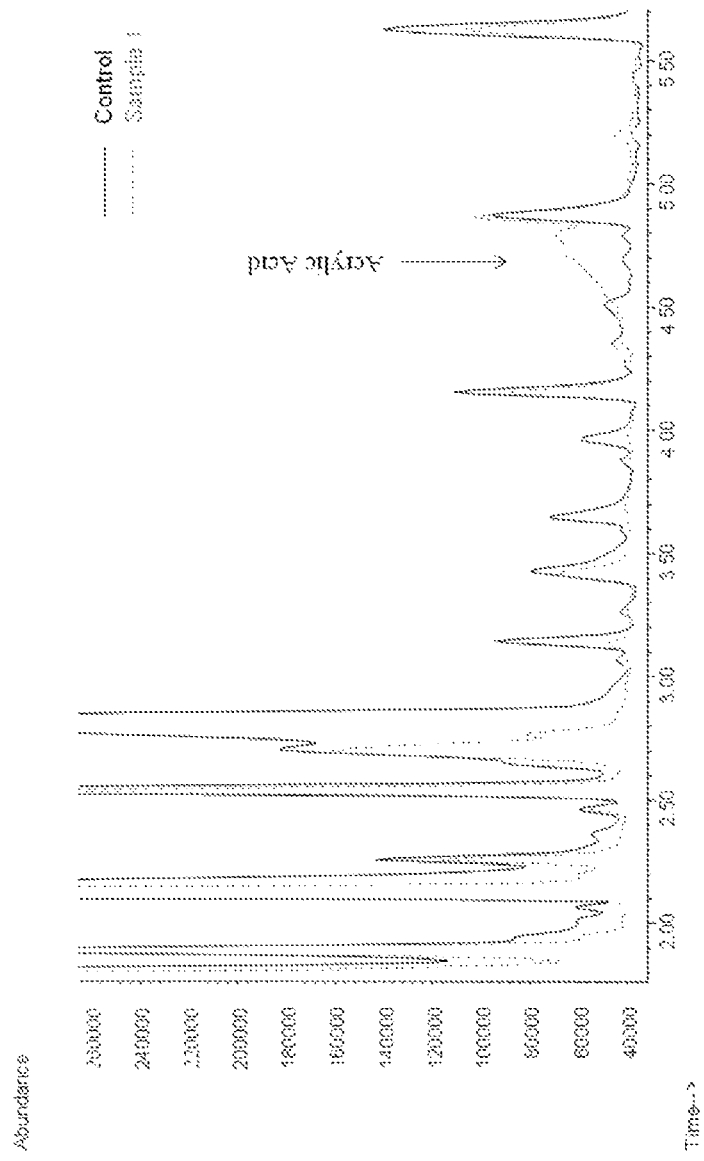
FIG. 1 is a graph depicting the amount of acrylic acid found in polypropylene foam samples as measured by headspace GC/MS consistent with the control polypropylene and sample 1 in the Example.

A detailed description will now be provided. The description includes specific embodiments, versions, and examples, but the disclosure is not limited to these embodiments, versions, or examples, which are included to enable a person having ordinary skill in the art to make and use the disclosure when that information is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Polymers

Polymers useful in this disclosure include styrenic polymers and polyolefins.

Styrenic monomers useful in the present disclosure include monovinylaromatic compounds such as styrene as well as alkylated styrenes wherein the alkylated styrenes are alkylated in the nucleus or side-chain. Alphamethyl styrene, t-butylstyrene, p-methylstyrene, methacrylic acid, and vinyl toluene are monomers that may be useful in forming a polymer of the disclosure. These monomers are disclosed in U.S. Pat. No. 7,179,873 to Reimers et al., which is incorporated by reference in its entirety. The styrenic polymer may be a homopolymer or may optionally comprise one or more comonomers. As used herein the term styrene includes a variety of substituted styrenes (e.g. alpha-methyl styrene), ring substituted styrenes such as p-methylstyrene, distributed styrenes such as p-t-butyl styrene as well as unsubstituted styrenes, and combinations thereof.

The monovinylidene aromatic polymer may be general purpose polystyrene or a rubber modified polymeric composition, such as high impact polystyrene, where an amount of rubber is dispersed in a styrenic matrix. Polybutadiene or a polymer of a conjugated 1,3-diene may be used in an amount of from 0.1 wt % to 50 wt % or more, or from 1% to 30% by weight of the rubber-styrene solution.

Examples of polyolefins include, but are not limited to, polyethylene, polypropylene, polyolefin elastomers, and combinations thereof. Polyolefin elastomers, include, but are not limited to polyisoprene, polybutadiene, chloroprene, butyl rubber, styrene butadiene, nitrile rubber, ethylene propylene rubber, epichlorohydrin rubber, polyacrylic rubber, silicone rubber, fluorosilicone rubber, fluoroelastomers, perfluoroelastomers, polyether block amides, chlorosulfonated polyethylene, and ethylene-vinyl acetate. Other non-limiting examples of polyolefins useful in the present disclosure include linear low density polyethylene, plastomers, high density polyethylenes, low density polyethylenes, medium density polyethylenes, polypropylene and polypropylene copolymers, for example. The polymer may also include functionalized versions of the above, for instance maleated polypropylene.

In one or more embodiments, the polyolefin is a propylene based polymer. As used herein, the term "propylene based" is used interchangeably with the terms "propylene polymer" or "polypropylene" and refers to a polymer having at least about 50 wt. %, or at least about 70 wt. %, or at least about 75 wt. %, or at least about 80 wt. %, or at least about 85 wt. %, or at least about 90 wt. %, or at least 95 wt. % polypropylene relative to the total weight of polymer, for example.

In some embodiments, the polypropylene may be, for instance, a propylene homopolymer, a propylene random copolymer, a propylene impact copolymer, a syndiotactic polypropylene, isotactic polypropylene or atactic polypropylene. In other embodiments, the propylene-based polymers may be a "mini-random" polypropylene. A mini-random polypropylene has less than about 1.0 wt % of the comonomer. In certain embodiments, the comonomer in the mini-random polypropylene is ethylene. The propylene based polymers may have a melting point ($T_m$) (as measured by DSC) of at least about 100° C., or from about 115° C. to about 175° C., for example. The propylene based polymers may include about 15 wt. % or less, or about 12 wt. % or less, or about 10 wt. % or less, or about 6 wt. % or less, or about 5 wt. % or less, or about 4 wt. % or less of xylene soluble material (XS), for example (as measured by ASTM D5492-06). In certain embodiments, the propylene based polymers may have a molecular weight distribution ($M_w/M_n$) of from about 2 to about 50, from about 6 to about 30, or greater than or equal to 8, for example, as measured by GPC. These propylene based polymers may have a melt flow rate (MFR) (as measured by ASTM D-1238 at 190° C. and a load of 2.16 kg) of from about 0.01 dg/min to about 30 dg/min., or from about 10 dg/min. to about 25 dg/min., or less than 25 dg/min, for example.

In one or more embodiments, the polymers include ethylene based polymers. As used herein, the term "ethylene based" is used interchangeably with the terms "ethylene polymer" or "polyethylene" and refers to a polymer having at least about 50 wt. %, or at least about 70 wt. %, or at least about 75 wt. %, or at least about 80 wt. %, or at least about 85 wt. %, or at least about 90 wt. %, or at least 95 wt. % polyethylene relative to the total weight of polymer, for example.

The ethylene based polymers may have a density (as measured by ASTM D-792) of from about 0.86 g/cc to about 0.98 g/cc, or from about 0.88 g/cc to about 0.965 g/cc, or from about 0.90 g/cc to about 0.965 g/cc, or from about 0.925 g/cc to about 0.97 g/cc, for example.

The ethylene based polymers may have a melt index ($MI_2$) (as measured by ASTM D-1238 at 190° C. and a load of 2.16 kg) of from about 0.01 dg/min to about 1000 dg/min., or from about 0.01 dg/min. to about 25 dg/min., or from about 0.03 dg/min. to about 15 dg/min. or from about 0.05 dg/min. to about 10 dg/min, for example.

In one or more embodiments, the polyolefins include low density polyethylene. In one or more embodiments, the polyolefins include linear low density polyethylene. In one or more embodiments, the polyolefins include medium density polyethylene. As used herein, the term "medium density polyethylene" refers to ethylene based polymers having a density of from about 0.92 g/cc to about 0.94 g/cc or from about 0.926 g/cc to about 0.94 g/cc, for example, as measured by ASTM D-792.

In one or more embodiments, the polyolefins include high density polyethylene. As used herein, the term "high density polyethylene" refers to ethylene based polymers having a density of from about 0.94 g/cc to about 0.97 g/cc, for example, as measured by ASTM D-792.

In certain non-limiting embodiments of the present disclosure, a mixture of one or more polyolefins may be used.

In certain embodiments of the present disclosure, the polyolefin or styrenic polymer may be combined with one or more organometallic compounds to form a polymeric composition. The organometallic compounds may include functionalized organometallic compounds such as an organometallic salt having acrylate functional groups, termed a "metallic acrylate salt," for example. Non-limiting examples of metallic acrylate salts are metallic diacrylates, such as zinc diacrylate, zinc dimethylacrylate, copper diacrylate, copper dimethylacrylate, and combinations thereof. Other organometallic compounds include zinc di-vinylacetate, zinc di-ethylfumarate, copper di-vinylacetate, copper diethylefumarate, aluminum triacrylate, aluminum trimethylacrylate, aluminum tri-vinylacetate, aluminum tri-ethylfumarate, zirconium tetraacrylate, zirconium tetramethylacrylate, zirconium tetra-vinylacetate, zirconium tetra-ethyl fumarate, sodium acrylate, sodium methacrylate, silver methacrylate, and combinations thereof. An example of a metallic diacrylate is product DYMALINK® 9200 (formerly SR732) or DYMALINK® 9201, both of which are commercially available from Cray Valley Specialty Chemicals. DYMALINK® 9200 is available as a white powder having a molecular weight of about 207 g/mol. DYMALINK® 9201 includes the metallic diacrylate in a pellet concentrate. The polymeric composition of the polymer and the organometallic compound may include between 0.001 and 8 wt % of the organometallic compound, between 0.01 and 6 wt % of the organometallic compound, less than or equal to 5 wt % of the organometallic compound, or about 2 wt % of the organometallic compound.

In some embodiments of the present disclosure, an additive may be combined with the polymeric composition. For example, the additive may be a peroxydicarbonate peroxide. In these embodiments, the peroxydicarbonate peroxide may have the general structure of ROC(O)O—O(O)COR$_1$ wherein R and R$_1$ represent alkyl and/or aryl groups. Non-limiting examples of peroxydicarbonate peroxides include, but are not limited to di(4-tert-butylcyclohexyl) peroxydicarbonate, dicetyl peroxydicarbonate, dimyristyl peroxydicarbonate, diisopropyl peroxydicarbonate, isopropyl sec-butyl peroxydicarbonate, di-sec-butyl peroxydicarbonate, di(2-ethylhexyl) peroxydicarbonate, and mixtures thereof. The polymeric composition may include between 0.001 and 3 wt % of the peroxydicarbonate peroxide, between 0.01 and 2.5 wt % of the peroxydicarbonate peroxide, or less than or equal to 2 wt % of the peroxydicarbonate peroxide.

Mixing of the organometallic compound with the polymer may be performed by melt mixing using medium to high intensity mixing equipment including single and twin screw extruders, BANBURY® mixers, or roll mill provided the metallic acrylte salt is adequately dispersed. Temperatures utilized for mixing may be 30° C. above the melting point of the polymer. In particular embodiments, the polymeric composition may be heated above 200° C., or between 200-260° C. In certain embodiments of the present disclosure, such as when a peroxydicarbonate peroxide is used, the organometallic compound may be formed in situ, i.e., may be formed during the melt mixing process. For instance, in one embodiment, the organometallic compound may be formed by mixing zinc oxide with acrylic acid while mixing with the polymer.

In other embodiments, the additive may be a polar polymer, including, but not limited to polylactic acid, polycaprolactone, polyethylene glycol, or mixtures thereof. In these embodiments, the polar polymer may be present in amounts of between 0.001 and 3 wt % of the polymeric composition, between 0.01 and 2.5 wt % of the polymeric composition, or less than or equal to 2 wt % of the polymeric composition. In some embodiments, both the peroxydicarbonate peroxide and the polar polymer may be present in the polymeric composition.

In still other embodiments, the additive may be a non-polar polymer, such as a polyolefin different from that of the polymeric composition. Examples include, but are not limited to, polypropylene and polyethylene. The non-polar polymer may be physically blended or chemically produced with the polymer of the polymeric composition, i.e., the non-polar polymer may be manufactured in conjunction with the polymer of the polymeric composition during formation of the polymer of the polymeric composition in one or more reactors, or the non-polar polymer may be physically blended, such as by single and twin screw extruders, BANBURY® mixers, or roll mills.

In certain embodiments of the present disclosure, the polyolefin or styrenic polymer may be mixed with a polar polymer such as polylactic acid, polycaprolactone, polyethylene glycol, or mixtures thereof in the absence of an organometallic compound to form a polymeric composition. In these embodiments, the polar polymer may be present in amounts of between 0.001 and 3 wt % of the polymeric composition, between 0.01 and 2.5 wt % of the polymeric composition, or less than or equal to 2 wt % of the polymeric composition.

In certain embodiments of the present disclosure, the polyolefin or styrenic polymer may be mixed with an acid neutralizer. Non-limiting acid neutralizers may include, for example, metal oxides, metal carbonates, hydroxides, metal stearates, and natural or synthetic hydrotalcite neutralizers. Metal oxides include, for example zinc oxide, magnesium oxide, titanium dioxide and combinations thereof. Metal carbonates include, for example, sodium carbonate, sodium bicarbonate, calcium carbonate, magnesium carbonate, and combinations thereof. Hydroxides include, for example, sodium hydroxide, potassium hydroxide, and combinations thereof. Examples of metal stearates include zinc stearate, calcium stearate, and combinations thereof. Examples of natural or synthetic hydrotalcite neutralizers include magnesium hydrotalcites such as DHT-4A®, DHT-4V®, DHT-4C® (all available from Kyowa Chemical Co.); HYSAFE® 539 and HYSAFE® 530 (available from J.M. Huber Corporation); L-55R™ acid neutralizers (available from Reheis Inc.); and zinc hydrotalcites such as ZH4-A™ (available from Kyowa Chemical Co.). In certain embodiments, different types of acid neutralizers may be combined, e.g., a metal oxide and a metal carbonate.

In certain embodiments, one or more acid neutralizers may be combined with the metallic acrylate salt and the polyolefin or styrenic polymer to form a polymeric composition that includes from between 500 ppm to 10% acid neutralizer, or between 0.1% and 7.5% acid neutralizer, or between 0.25% and 4.0% acid neutralizer, all by total weight of the polymeric composition. In other embodiments, a "masterbatch" or concentrate may be formed. For instance, the polyolefin or styrenic polymer may be mixed with the acid neutralizer to form a mixture that includes between 10% and 90% or between 30% and 70%, or between 40% and 60%, or about 50% acid neutralizer by weight of the mixture. This masterbatch may be subsequently combined with a mixture of metal acrylate salt and polyolefin or styrenic polymer to achieve a polymeric composition that includes from between 500 ppm to 10% acid neutralizer, or between 0.1% and 7.5% acid neutralizer, or between 0.25% and 4.0%, or at least 3% acid neutralizer, all by total weight of the polymeric composition.

It has been found that the inclusion of an acid neutralizer in the polymeric composition may control odor resulting from the presence of acids in the polymer foam, such as, for instance, acrylic acid. In certain embodiments, the acid neutralizer may reduce the amount of acrylic acid by about 75% or more, about 95% or more, or approximately 100% as compared to a polymer foam with a metallic acrylate salt without the acid neutralizer. In other embodiments, the acid neutralizer may reduce the amount of acrylic acid by between 75% and 95% as compared to a polymer foam with an acrylate salt without an acid neutralizer.

In certain embodiments, the only components added to the polymeric composition are the polyolefin or styrenic polymer, the metal acrylate and the acid neutralizer. In other embodiments, the polymeric composition may contain additives such as antioxidants, light stabilizers, acid scavengers, lubricants, antistatic additives, nucleating/clarifying agents, colorants, or combinations thereof. In an embodiment, the additives are present in a quantity from 0.01 to 5 wt %, optionally from 0.1 to 3 wt %, optionally from 0.5 to 2 wt %, in relation to the weight of the polymeric composition. In some embodiments, the polymeric composition may be pelletized.

In some embodiments of the present disclosure, the melt flow rate of the polymeric composition may be from 0.1 g/10 min to 50 g/10 min, or between 1 g/10 min to 10 g/10 min, or between 1.5 g/10 min and 6 g/10 min as measured by ASTM D-1238 at 190° C. and a load of 2.16 kg. The die swell of the polymeric composition may be between 1 and 15, or between 3 and 10, or between 4 and 8 as measured by ASTM D-3835.

Product Application

The polymer compositions are useful in the manufacture of polymer foamed sheets or foamed polymeric layers in films (collectively referred to as "polymer foams" hereinafter). The polymer foam may be prepared from polymeric composition and a foaming agent. In certain embodiments, prior to foaming, the pelletized or unpelletized polymeric composition may be combined with additives, such as antioxidants, light stabilizers, acid scavengers, lubricants, antistatic additives, nucleating/clarifying agents, colorants, or combinations thereof. The polymeric composition may be of the type described previously herein. The foaming agent may be any foaming agent compatible with the other components of the polymeric composition such as for example physical foaming agents, chemical foaming agents, and the like. Physical foaming agents are typically gases that are able to evacuate the polymeric composition quickly leaving voids in the polymeric composition. Chemical foaming agents are chemical compounds that decompose endothermically at elevated temperatures. Decomposition of the chemical foaming agents generates gases that become entrained in the polymeric composition, thus leading to the formation of voids within the polymeric composition. Non-limiting examples of foaming agents suitable for use in this disclosure include without limitation pentane, isopentane carbon dioxide, nitrogen, water vapor, propane, n-butane, isobutane, n-pentane, 2,3-dimethylpropane, 1-pentene, cyclopentene, n-hexane, 2-methylpentane, 3-methylpentane, 2,3-dimethylbutane, 1-hexene, cyclohexane, n-heptane, 2-methylhexane, 2,2-dimethylpentane, 2,3-dimethylpentane, and combinations thereof.

In an embodiment, the foamed polymeric composition is prepared by contacting the polymeric composition with the foaming agent, and thoroughly mixing the components for example by compounding or extrusion. In an embodiment, the polymeric composition is plasticized or melted by heating in an extruder and is contacted and mixed thoroughly with the foaming agent. Alternatively, the polymeric composition may be contacted with the foaming agent prior to introduction of the mixture to the extruder (e.g., via bulk mixing), during the introduction of the polymeric composition to an extruder, or combinations thereof.

Examples of additives and foam manufacturing methods may be found in PCT/US2012/043018, filed Jun. 18, 2012 by Berry Plastics Corporation, which is fully incorporated herein by reference.

In certain embodiments of the present disclosure, the polymer foam exhibits an open cell content of less than 80%, less than 50%, or less than 30%. In certain embodiments, cells in the polymer foam that are not open are closed cells.

In some embodiments, the density of the polymer foam is less than 0.50 g/cc, less than 0.25 g/cc or less than 0.20 g/cc. In certain embodiments, the polymer foam has a density of between 0.15 and 0.20 g/cc and an open cell content of between 30% and 40%.

Example

In the Example, a control PP grade (Total LUMICENE® M3766 commercially available from Total Petrochemicals and Refining USA, Inc.) was compared with five polymeric compositions (Samples 1 through 5 described in Table 1) on the content of acrylic acid generated after heating. A series of foam samples were formed. Sample 1 was a foam extruded from a polypropylene composition including 2 wt % zinc diacrylate (DYMALINK® 9200 from Total Cray Valley). For samples 2 through 5, a zinc oxide masterbatch (50% zinc oxide and 50% polypropylene) and a sodium carbonate masterbatch (50% sodium carbonate and 50% polypropylene) were formed in accordance with the description above and used along with the polymeric composition used in Sample 1 to form foam samples as described in Table 1.

TABLE 1

|  | Description |
| --- | --- |
| Control PP | Commercially available PP homopolymer grade (Total M3766) |
| Sample 1 | PP + 2% zinc diacrylate (DYMALINK ® 9200 from Total Cray Valley) |
| Sample 2 | Sample 1 + 2% Zinc Oxide masterbatch (50% Zinc Oxide + 50% PP) |
| Sample 3 | Sample 1 + 2% Sodium carbonate masterbatch (50% Sodium Carbonate + 50% PP) |
| Sample 4 | Sample 1 + 2% Zinc Oxide masterbatch (50% Zinc Oxide + 50% PP) + 2% Sodium carbonate masterbatch (50% Sodium Carbonate + 50% PP) |
| Sample 5 | Sample 1 + 3% Zinc Oxide masterbatch (50% Zinc Oxide + 50% PP) + 3% Sodium carbonate masterbatch (50% Sodium Carbonate + 50% PP) |

Each of the foams was examined for the presence of acrylic acid using a headspace gas chromatography-mass spectrometry (GC-MS) method. The GC-MS conditions are presented in Table 2.

TABLE 2

| GC Oven Temperature | 35° C. (5 min) - 20° C./min -250° C. - 6° C./min - 320° C. (3 min) |
| --- | --- |
| GC Inlet Temperature | 320° C. |
| Separation Column | Ultra-ALLOY + −5 L = 30 m, i.d. = 0.25 mm, df = 0.5 μm |
| Column flow rate | 1 mL/min He, split ratio: 1/50 |
| Sample size | 200 uL |
| Detector | MS (m/z: 35-800, 2 scans/sec) |

Figure 2:
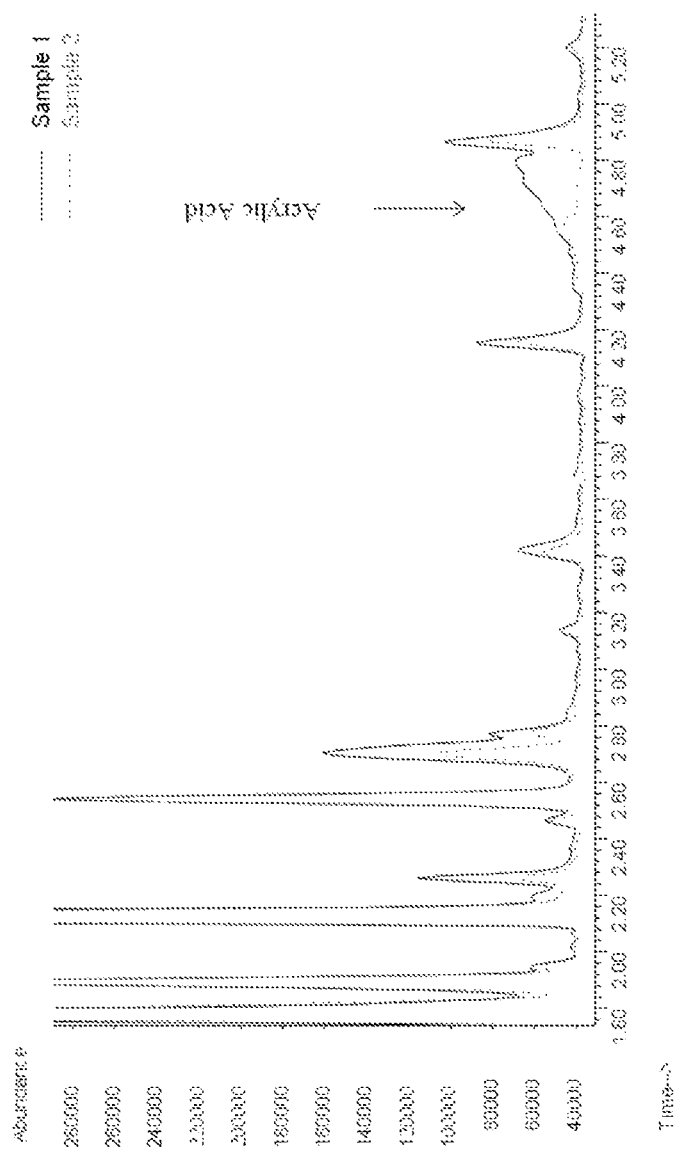
FIG. 2 is a graph depicting the amount of acrylic acid found in polypropylene foam samples as measured by headspace GC/MS consistent with the samples 1 and 2 in the Example.
Figure 3:
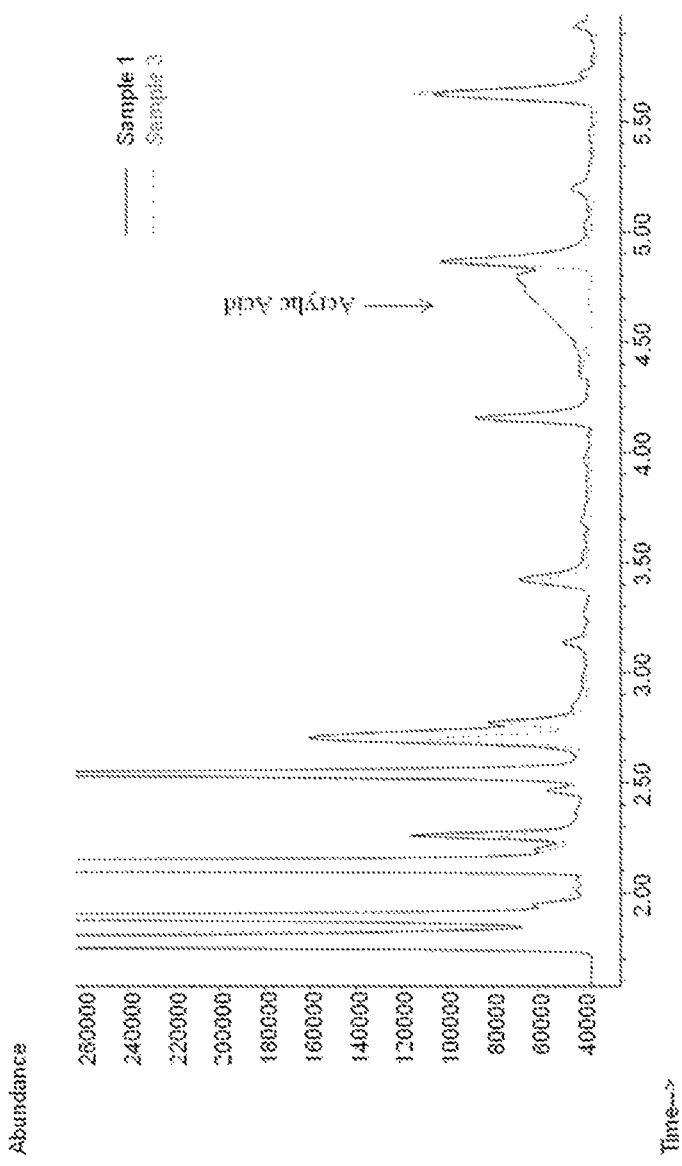
FIG. 3 is a graph depicting the amount of acrylic acid found in polypropylene foam samples as measured by headspace GC/MS consistent with the samples 1 and 3 in the Example.
Figure 4:
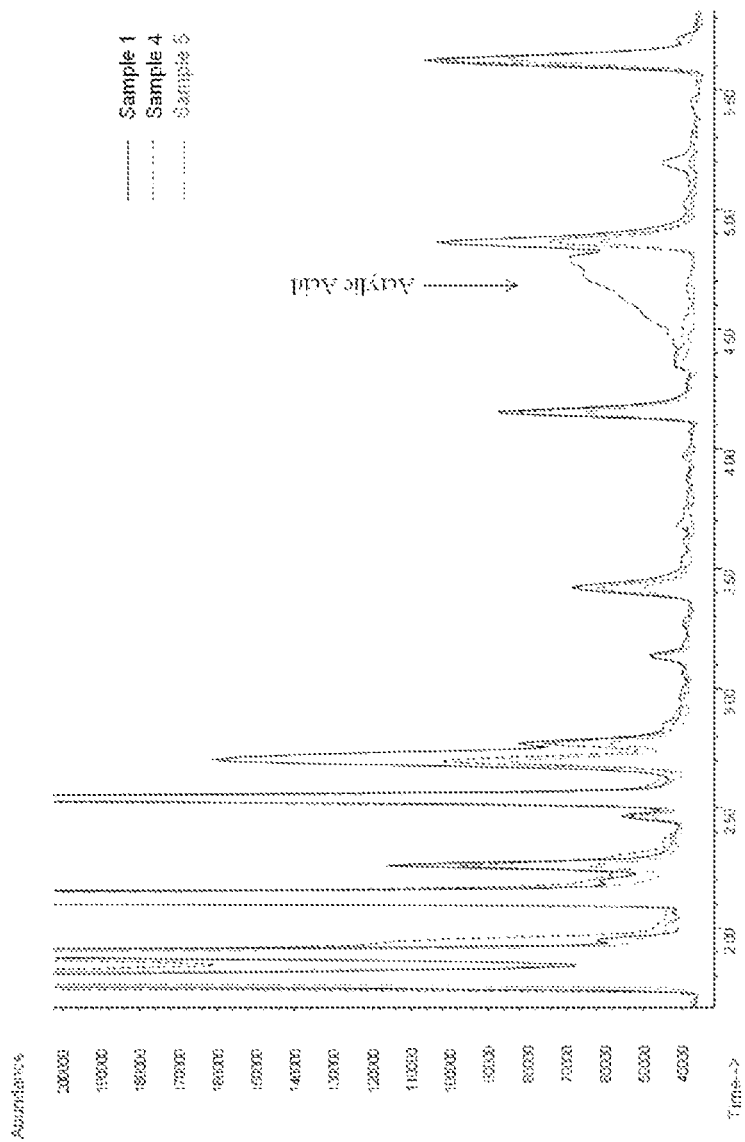
FIG. 4 is a graph depicting the amount of acrylic acid found in polypropylene foam samples as measured by headspace GC/MS consistent with the samples 1, 4, and 5 in the Example.

The results of the GC-MS method are shown in FIGS. 1-4. The reduction in acrylic acid was calculated on a comparison of sample 2 with samples 3, 4, and 5. The results of this calculation are shown in Table 3.

TABLE 3

|  | Acid Neutralizer | Amount of Acid Neutralizer [%] | Reduction in Acrylic Acid [%] |
| --- | --- | --- | --- |
| Sample 1 | — | — | — |
| Sample 2 | Zinc Oxide | 1% | 74.9 |
| Sample 3 | Sodium Carbonate | 1% | 94.6 |
| Sample 4 | Zinc Oxide and Sodium Carbonate | 2% | 95.1 |
| Sample 5 | Zinc Oxide and Sodium Carbonate | 3% | ~100 |

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. A polymeric composition consisting of:
   more than 50 weight % of a polypropylene or styrenic polymer;
   a metallic acrylate salt; and
   one or more acid neutralizers, wherein the one or more acid neutralizers are present in an amount greater than or equal to a weight percentage of the metallic acrylate salt, and wherein an amount of acrylic acid in the polymeric composition is between 75% and 95% less than a second polymeric composition consisting of:
   more than 50 weight % of the polypropylene or styrenic polymer; and
   the metallic acrylate salt.

2. The polymeric composition of claim 1, wherein the metallic acrylate salt is present in the polymeric composition in an amount of between 0.01 and 6 wt %.

3. The polymeric composition of claim 2, wherein the metallic acrylate salt is present in the polymeric composition in an amount of less than 5 wt %.

4. The polymeric composition of claim 2, wherein the metallic acrylate salt is metallic diacrylate.

5. The polymeric composition of claim 2, wherein the metallic acrylate salt is zinc diacrylate, zinc dimethylacrylate, copper diacrylate, copper dimethylacrylate, zinc di-vinylacetate, zinc di-ethylfumarate, copper di-vinylacetate, copper diethylefumarate, aluminum triacrylate, aluminum trimethylacrylate, aluminum tri-vinylacetate, aluminum tri-ethylfumarate, zirconium tetraacrylate, zirconium tetramethylacrylate, zirconium tetra-vinylacetate, zirconium tetraethyl fumarate, sodium acrylate, sodium methacrylate, silver methacrylate, or combinations thereof.

6. The polymeric composition of claim 1, wherein the acid neutralizer is a metal oxide, metal carbonate, hydroxide, metal stearate, natural hydrotalcite, synthetic hydrotalcite, or a combination thereof.

7. The polymeric composition of claim 6, wherein the acid neutralizer is zinc oxide, magnesium oxide, titanium dioxide, sodium carbonate, sodium bicarbonate, calcium carbonate, magnesium carbonate, sodium hydroxide, potassium hydroxide, zinc stearate, calcium stearate, a magnesium hydrotalcite, a zinc hydrotalcite, or a combination thereof.

8. The polymeric composition of claim 7, wherein the acid neutralizer is a combination of zinc oxide and sodium carbonate.

9. The polymeric composition of claim 1, wherein the polymeric composition comprises a 3:2 weight percentage ratio of each neutralizer to the metallic acrylate salt.

10. The polymeric composition of claim 9, wherein the polymeric composition comprises 3 weight % acid neutralizer.

11. A foam comprising:
a polymeric composition consisting of:
more than 50 weight % of a polypropylene or styrenic polymer;
at least 1% metallic acrylate salt; and
one or more acid neutralizers, wherein the one or more acid neutralizers are present in an amount greater than or equal to a weight percentage of the metallic acrylate salt and wherein an amount of acrylic acid in the foam is between 75% and 95% less than a second foam comprising:
a polymeric composition consisting of:
more than 50 weight % of the polypropylene or styrenic polymer; and
at least 1% metallic acrylate salt.

12. A polymeric composition consisting of:
more than 50 weight % of a polypropylene or styrenic polymer;
a metallic acrylate salt; and
one or more acid neutralizers, wherein the acid neutralizer is a metal stearate, natural hydrotalcite, synthetic hydrotalcite, or a combination thereof, and wherein the one or more acid neutralizers are present in an amount greater than or equal to a weight percentage of the metallic acrylate salt, wherein an amount of acrylic acid in the polymeric composition is between 75% and 95% less than a second polymeric composition consisting of:
more than 50 weight % of a polypropylene or styrenic polymer; and
a metallic acrylate salt.

* * * * *